(12) United States Patent
Spalink et al.

(10) Patent No.: US 8,214,692 B1
(45) Date of Patent: Jul. 3, 2012

(54) SYSTEM AND METHOD FOR ENFORCING A THIRD-PARTY FACTORY TEST

(75) Inventors: Tammo Spalink, Taipei (TW); Hung-Te Lin, Taipei (TW); Vincent Wu, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/273,173

(22) Filed: Oct. 13, 2011

Related U.S. Application Data (60) Provisional application No. 61/542,121, filed on Sep. 30, 2011.

(51) Int. Cl.
*G06F 11/00* (2006.01)

(52) U.S. Cl. ................... 714/32; 713/1; 713/2

(58) Field of Classification Search ............ 714/32
See application file for complete search history.

(56) References Cited

U.S. PATENT DOCUMENTS

| | | | |
|---|---|---|---|
| 6,122,755 A * | 9/2000 | Chang et al. ............... 714/25 |
| 7,711,944 B2 * | 5/2010 | Kwon ....................... 713/2 |
| 7,739,717 B1 * | 6/2010 | Kuether et al. ............. 725/107 |
| 2004/0039561 A1 * | 2/2004 | Montano et al. ............. 703/22 |
| 2005/0066015 A1 * | 3/2005 | Dandekar et al. ........... 709/220 |
| 2007/0106890 A1 * | 5/2007 | Kwon ....................... 713/1 |
| 2007/0157015 A1 * | 7/2007 | Swanson et al. ............ 713/2 |
| 2007/0240154 A1 * | 10/2007 | Gerzymisch et al. ........ 717/174 |
| 2008/0178144 A1 * | 7/2008 | Bazigos et al. ............. 717/101 |
| 2009/0222483 A1 * | 9/2009 | Johnson et al. ............. 707/104.1 |
| 2009/0222813 A1 * | 9/2009 | Johnson et al. ............. 717/174 |
| 2009/0222826 A1 * | 9/2009 | Johnson et al. ............. 718/102 |
| 2009/0327675 A1 * | 12/2009 | Cherian et al. ............. 713/1 |

* cited by examiner

*Primary Examiner* — Kamini Patel (74) *Attorney, Agent, or Firm* — McDermott Will & Emery LLP (57) ABSTRACT

A system and method is disclosed for enforcing a third-party factory test during a quality verification of a newly-manufactured computing device. During an assembly line quality verification, a factory implemented test and a required third-party factory test are executed on a computing device, and then the execution verified by an external process. On verifying the required third-party factory test was executed, the computing device is configured to execute a release image on a subsequent startup of the computing device.

24 Claims, 5 Drawing Sheets

SYSTEM AND METHOD FOR ENFORCING A THIRD-PARTY FACTORY TEST

REFERENCE TO RELATED APPLICATIONS

The present application claims priority benefit under 35 U.S.C. §119(e) from U.S. Provisional Application No. 61/542,121, filed Sep. 30, 2011, which is incorporated herein by reference in its entirety.

TECHNICAL FIELD

The subject technology relates generally to the manufacturing and testing of computing devices.

BACKGROUND

Manufacturing of computers may involve several parties. For example, while an original equipment manufacturer (OEM) is typically synonymous with the branding of a computer, and is responsible for its overall quality, the actual manufacturer of a computer may be a different party. Third parties, such as operating system providers, who are not normally involved in the manufacturing process, may also have an interest in controlling the quality of some aspects of the manufacturing process. There is, however, no means to provide a third-party provider control over modifications made to the hardware (for example, parts previously approved for manufacturing) or software (for example, the boot image provided by the third-party) during the manufacture of a computer, other than through tight integration with the OEM and manufacturer of the computer.

SUMMARY

The subject technology provides a system and computer-implemented method for enforcing a third-party factory test during a quality verification of newly-manufactured computing devices. According to one aspect, a system includes an assembly line configured to receive one or more computing devices and to assesses a quality of those devices, a storage device, and a monitoring computer including a memory. The memory includes computer testing instructions, that, when executed, cause the monitoring computer to verify a factory implemented test and a required third-party factory test was performed on a device under test, verify the required third-party factory test was completed without a failure, and, on verifying the required third-party factory test was completed without a failure, transmit a test report to the storage device and configure the device under test to execute a release image on a subsequent startup of the device.

In another aspect, a method includes configuring a computing device to execute a factory implemented test and a required third-party factory test, executing the factory implemented test and the required third-party factory test, verifying the required third-party factory test was executed, and on verifying the required third-party factory test was executed, configuring the device to execute a release image on a subsequent startup of the device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
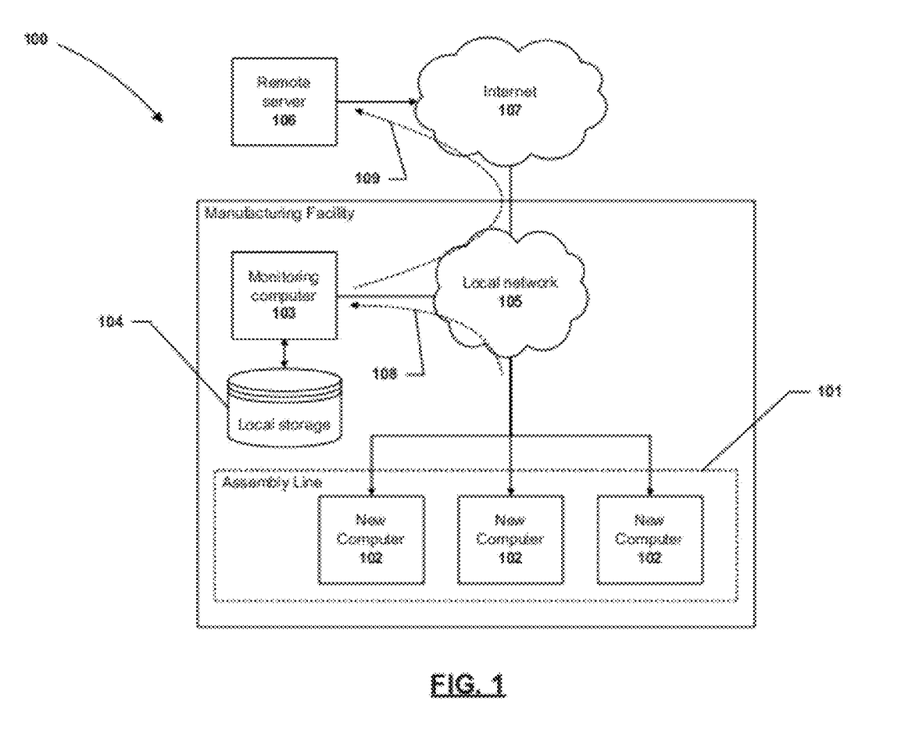
FIG. 1 is a diagram of a system for enforcing a third-party factory test during a quality verification of newly-manufactured computing devices according to one aspect of the subject technology.

FIG. 1 is a diagram of a system for enforcing a third-party factory test during a quality verification of newly-manufactured computing devices according to one aspect of the subject technology. A computer-enabled system 100 may include an assembly line 101 configured to receive one or more computing devices 102 (including, for example, a personal or notebook computer, tablet computer, smart phone, MA, or the like), a monitoring computer 103, and a quality information storage 104 (for example, a database or file system). Assembly line 101 may include a sequential organization of technicians, tools or machines, and/or parts to facilitate the manufacture and/or testing of a plurality of devices 102. For example, as will be described further, assembly line 101 may be configured to facilitate the quality assurance testing of one or more hardware systems of a device 102 through the enforcement of a factory test (for example, a boot test). In another aspect, assembly line 101 may include one or more technicians performing the manufacture and/or testing of the plurality of devices 102, one device at a time.

System 100 may ensure that tests relevant to the third-party provider are executed during the manufacturing processes. A third-party provider (for example, a software provider or provider of an operating system) may require the manufacturer of a device 102 and/or the OEM to perform a required third-party factory test (for example, in the form of an image bootable by device 102) during the manufacture of the device. For example, an operating system provider may require certain tests be performed on a device to ensure compatibility with certain software components (for example a final operating system) or hardware components (for example, hardware previously verified by the third-party provider) before it is released for sale to the public. The provider may wish to limit its interaction with a manufacturer of a device with regard to implementing a more expanded factory testing process. In this regard, a monitoring computer 103 may be configured to monitor ongoing tests (hardware and software) performed at assembly line 101 and to facilitate a mechanism for ensuring that a device under test and its related hardware is in compliance with the third-party provider's software (for example, the boot image shipped with the device). As long as the hardware and/or software of the device meets the criteria of the third-party provider through testing of the device through performing a required third-party factory test, the manufacturer of the device and/or OEM may retain the freedom to adapt or make changes to the factory testing process, all while reducing the potential for further bugs introduced from iterative modifications to the software or hardware required by both parties to resolve any conflicts arising from those changes.

In one aspect, monitoring computer 103 may be operably connected to a device 102 via a wired or wireless network 105. Network 105 may be operably connected to assembly line 101, or one or more devices 102 under test at assembly line 101. In another aspect, testing results may be input (for example, by an test technician performing a test) at a display terminal associated with computer 103. Computer 103 may store (for example, in a memory or at storage 104) one or more test procedures to be enforced at assembly line 101. In some aspects, enforcement of a test procedure may be through a series of predefined testing screens, each requiring input of a test results to be verified against a predetermined number of testing criteria. In other aspects, enforcement may be through adherence to the procedure by one or more technicians responsible for carrying out the test.

Computer 103 may be configured to verify that one or more tests (for example, a factory implemented test and a required third-party factory test) were performed on a device 102. As will be described in further detail with regard to FIG. 2, computer 103 may be configured to load and execute, or verify the execution of, one or more boot images loaded on device 102. Computer 103 may be further configured to verify whether the tests performed were completed without a failure (for example, of a hardware component), and then transmit test results to quality information storage 104. Device 102 may then be configured to execute (for example, transition to) a release image on a subsequent startup of the device. Computer 103 may be configured to automatically verify and configure device 102 via communication between computer 103 and device 102, or, in other aspects, configuration may be through user input received at a terminal associated with computer 103, for example, in accordance with a predefined testing procedure. In a further aspect, verifying that one or more tests were performed or completed without failure may include receiving an indication from a device 102 that the tests were performed or completed without failure. In this regard, device 102 may execute, or verify the execution of one or more boot images loaded on device 102 and send a signal representative of a pass or fail to computer 103. Computer 103 may receive the signals from the plurality of devices 102 and record the results in local storage 104.

In accordance with one aspect of the subject technology, system 100 may further include a remote verification server 106 operably connected to monitoring computer 103 via a network 107 (for example, over a secure WAN, LAN, or the Internet). Monitoring computer 103 may be configured to receive 108 test result data (for example, hardware performance data) for each device tested at assembly line 101, collecting the result data for a plurality of devices 102 over a predetermined period of time. Computer 103 may further be configured to summarize the plurality of test results into a summary report and then transmit 109 the summary report to remote verification server 106 via network 107. In some aspects, the summary report may be automatically transmitted to remote verification server 106 at predetermined intervals. Each predetermined interval may be determined by a predetermined period of time or by the completion of a predetermined number of computer-enable devices 102. Remote verification server 106 may collect manufacturing data from monitoring computer 103 and may be configured to alert third-parties of non-compliance or failure of required third-party factory tests. Remote verification server 106 may also regularly update monitoring computer 103 with new versions of required third-party factory tests (including, for example, a required test image).

Figure 2:
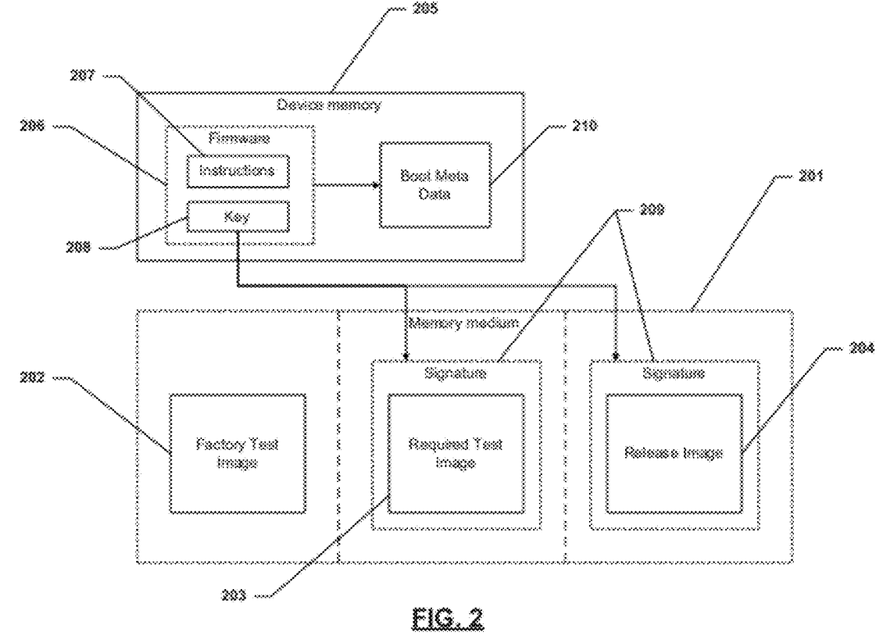
FIG. 2 is a diagram of a boot sequence for enforcing a third-party factory test during a quality verification of a newly-manufactured computing device according to one aspect of the subject technology.

FIG. 2 is a diagram of a boot sequence for enforcing a third-party factory test during a quality verification of a newly-manufactured computing device according to one aspect of the subject technology. During the quality verification of the computer, a memory medium 201 (for example, a hard drive) may be partitioned to include two or more separate boot images. A first boot image may include a factory test image 202. In one aspect, factory test image 202 may not include standard operating system features (for example, a browser), but, rather, may include a limited feature set configured to test only the hardware systems of the computer (for example, physical memory addresses and hardware functions, network capability, and the like). Factory test image 202 may be responsible for verifying certain aspects of computer hardware, including, for example, that each of those hardware systems are functioning and meet a predetermined performance criteria. Performance criteria may include, for example, stability, storage capability, display and graphics performance, processor and/or graphics benchmarks, energy usage, and the like. Factory image 202 may be implemented, reconfigured, and/or modified by the manufacturer of the device in conjunction with the OEM or other third party (for example, operating system provider) to facilitate testing of different hardware and/or software configurations.

A second boot image may be a required test image 203 that, similar to the first image, is limited to testing the hardware of the machine to make sure that the hardware meets a second predetermined performance criteria. Required image 203 may be provided by the third-party provider, and, unlike factory test image 202, required test image 203 may further be limited to testing only those features of the device that the third-party provider is interested in. Thus, the second predetermined performance criteria may be set with regard to a more limited hardware features set (for example, components, power-on functions, functionality, and the like). During the quality verification of the computer, factory test image 202 and required test image 203 may be executed by a computing device (for example, device 102) to test the hardware of the device, and that there are no failures of the hardware components, systems and/or features of the device under test. Once hardware testing has been completed successfully, a third, release image 204 may be installed, including the final operating system for use by an end-user. Release image 204 may be installed by loading release image 204 onto a third partition, or, by repartitioning memory medium 201 to only include release image 204. On the other hand, if the performance criteria is not met, or testing did not complete successfully, release image 204 may not be installed.

The device under test may include a device memory 205 (for example, a ROM) including firmware 206. Firmware 206 may also include initiation and/or test instructions 207 that, when executed by a processor of the device under test, are operable to cause the processor to initiate a boot sequence and to load and execute one or more of the previously described boot images. In some aspects, test instructions 207 may cause the device under test to perform a verification of a boot image. For example, as the device is booted, a cryptographic key 208 may be used to verify a signature 209 of the boot image or a portion of the boot image. In this regard, the device may perform a checksum or similar verification, and, if a stage cannot be verified, prevent the unverified stage from executing on the device. As depicted by FIG. 2, required test image 203 and release image 204 may be cryptographically signed 209 by a third party (for example, a party other than the manufacturer of the device) and configured to not be modified by the manufacturer, OEM, or other party. Cryptographic key 208 may be included in a non-modifiable firmware 206 (for example, on a ROM) or portion thereof. Firmware 206 may be provided, for example, by the third party operating system provider to be included as part of the machine during manufacture, to verify the signatures of required boot image 203 and release boot image 204, and to ensure that the images are not modified during the manufacturing process. If either image cannot be verified, the firmware may prevent the device from booting from the unverified image, and/or prevent release image 204 from being installed.

The order that the images are booted during the quality verification cycle may be predetermined and maintained in a meta data area 210 of device memory 205. In other aspects, meta data area 210 may be stored on memory medium 201 (for example, on a hard drive). The predetermined order may be stored in memory medium 201, along with factory boot image 202 and required boot image 203. Test instructions 207, when executed, may cause the computing device to update meta data area 210 with a confirmation (for example, by setting a flag) that the factory boot image and the required boot image were executed. Test instructions 207 may also update meta data 210 with a confirmation that signature 209 was verified. In one aspect, test instructions 207 may cause the device to determine whether the required image was executed and/or that all hardware tests have been completed (for example, by the successful execution of the boot images). On determining that required test 203 was executed, meta data area 210 may be configured to set the computing device to boot from a release image 204 the next time the device is powered on. Alternatively, if it is determined that required image 203, for example, was not executed or that one or more of the tests executed by required image 203 faded, then meta data area 210 may be configured such that the device is prevented from booting from and/or executing the release image.

In another aspect, feedback related to the boot verification process may be provided via a communication channel between a server at the manufacturer facility and a server controlled by the third party. For example, a local computer (for example, monitoring computer 102) may be operably connected to memory medium 201 or device memory 205 via an interface of the device (for example, a wireless connection, or standard interface, such as Serial-Attached SCSI (SAS), Fiber Channel interface, PCI Express (PCIe), SATA, USB, and the like). In this regard, the local computer may monitor each device under test in an assembly line and store test results in a local storage (for example, quality information storage 103). The report may then be transmitted when testing is completed, or together with other reports (for example, in a Summary report), on a periodic basis.

Figure 3:
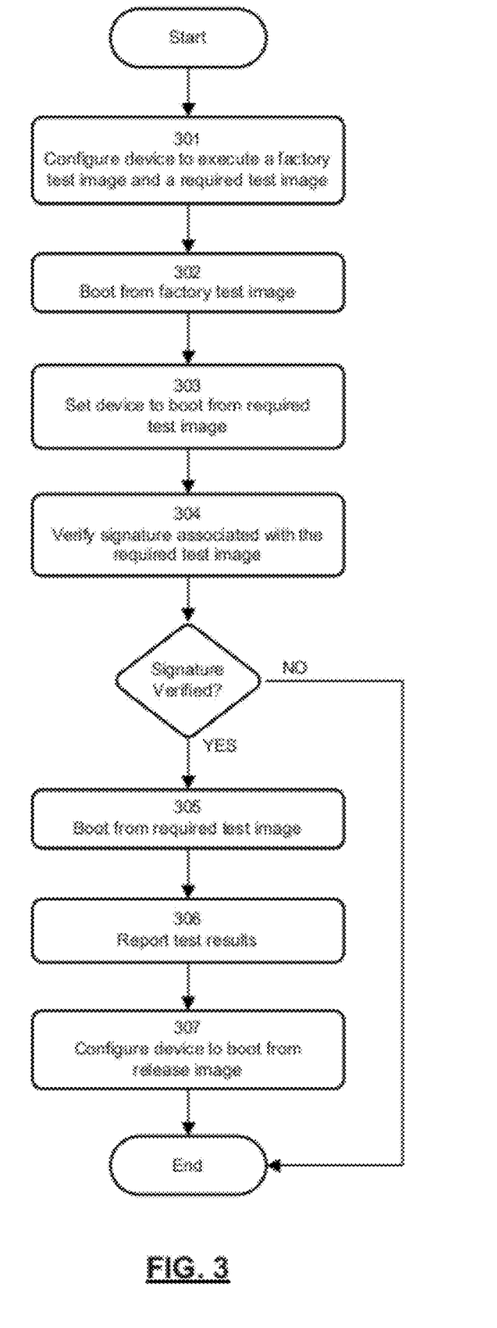
FIG. 3 is a flowchart illustrating a process for enforcing a third-party factory test during a quality verification of a newly-manufactured computing device according to one aspect of the subject technology.

FIG. 3 is a flowchart illustrating a process for enforcing a third-party factory test during a quality verification of newly-manufactured computing devices according to one aspect of the subject technology. In a first step 301, a computing device (for example, computing device 102) is configured to execute a factory test image and a required test image. In one aspect, configuring the device may include loading the two images onto two respective partitions of a memory associated with the device. In another aspect, configuring the device may include operably connecting the device to a remote location (for example, a removable disk, thumb drive, remote server, or the like) from which to load one or both of the images. In a second step 302, the device boots from and executes the factory test image to test certain hardware systems and/or features. After the factory test image has been executed without a failure of one or more of the hardware components, systems and/or features, in a third step 303, the device is set to boot from the required test image.

In a fourth step 304, a signature associated with the required test image is verified to determine that the required test image has not been altered during the manufacturing process. The signature may be a cryptographic signature created by a third party (for example, a provider of the release image/operating system) to ensure that the image is not modified. If the signature cannot be verified then the process ends. Otherwise, on verifying that the signature is valid, in a fifth step 305, the computing device boots from and executes the required test image. During the boot process, the hardware components of the device are tested according to test instructions written to the boot code by the third party provider. On a successful boot, in a sixth step 306, one or more test results may be organized into a report and transmitted to a local or remote storage. The test results may include whether the required test image was executed and/or whether any hardware failures were detected. In some aspects, further test results may be collected from one or more other devices under test and organized into a summary report for transmission to the third party provider. In this manner, the third party provider may ensure that the required test image is being executed on all or a significant majority of the devices manufactured at the assembly line. In a seventh step 307, the device is configured to execute a release image on a subsequent startup of the device.

Figure 4:
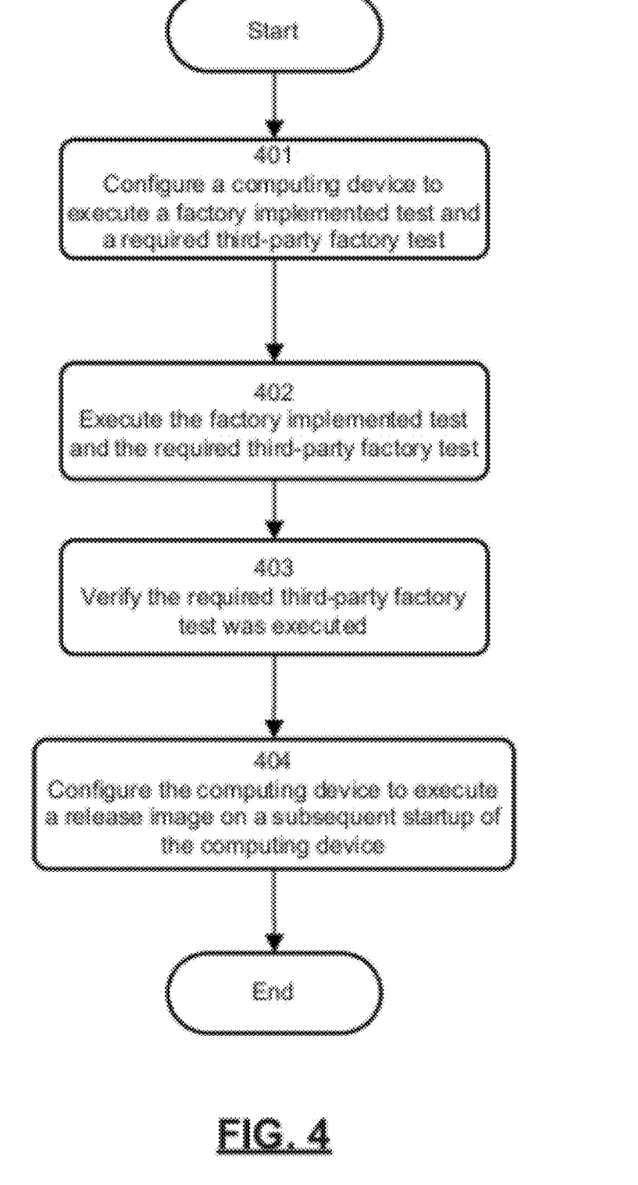
FIG. 4 is an alternative flowchart illustrating a process for enforcing a third-party factory test during a quality verification of newly-manufactured computing devices according to one aspect of the subject technology.

FIG. 4 is an alternative flowchart illustrating a process for enforcing a third-party factory test during a quality verification of newly-manufactured computing devices according to one aspect of the subject technology. In a first step 401, a computing device is configured to execute a factory implemented test and a required third-party factory test. In a second step 402, the factory implemented test and the required third-party factory test are executed. In a third step 403, execution of the required third-party factory test is verified. On verifying the required third-party factory test was executed, in a fourth step 404, the computing device is configured to execute a release image on a subsequent startup of the computing device.

Figure 5:
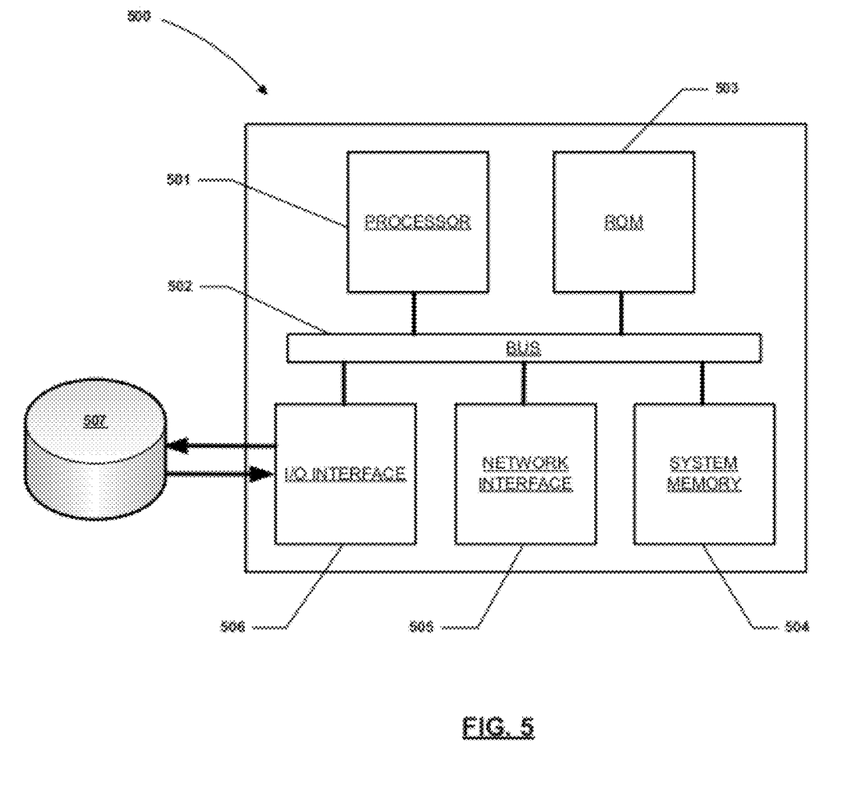
FIG. 5 is a diagram illustrating a machine or computer for enforcing a third-party factory test during a quality verification of newly-manufactured computing devices, including a processor and other internal components, according to one aspect of the subject technology.

FIG. 5 is a diagram illustrating a machine or computer for enforcing a third party factory test during a quality verification of newly-manufactured computing devices, including a processor and other internal components, according to one aspect of the subject technology. In some aspects, a computerized device 500 (for example, monitoring computer 103, remote server 106, or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium 507 (for example, via I/O interface 506). ROM 503, system memory 505, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system Memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for enforcing a third-party factory test during a quality verification of newly-manufactured computing devices, comprising:
    configuring a computing device to execute a factory implemented test and a required third-party factory test;
    executing the factory implemented test and the required third-party factory test in a predetermined order;
    verifying the required third-party factory test was executed; and
    on verifying the required third-party factory test was executed, configuring the computing device to execute a release image on a subsequent startup of the computing device by updating a meta data area of memory in the computing device.

2. The computer-implemented method of claim 1, wherein executing the factory implemented test and the required third-party factory test includes: executing a factory boot image to confirm a plurality of components are functioning according to a first predetermined performance criteria; and executing a required boot image to confirm one or more third-party compatible components are functioning according to a second predetermined performance criteria.

3. The computer-implemented method of claim 2, wherein the factory boot image and required boot image are loaded and automatically executed on the computing device.

4. The computer-implemented method of claim 3, wherein the predetermined order is stored in the memory.

5. The computer-implemented method of claim 4, wherein updating the meta data area includes updating the meta data area with a confirmation that the factory boot image and the required boot image were executed.

6. The computer-implemented method of claim 1, wherein executing the required third-party factory test includes:
    verifying a signature associated with a required boot image to confirm the required boot image has not been modified; and
    on verifying the signature, booting the computing device from the required boot image.

7. The computer-implemented method of claim 6, wherein, on
    determining the signature cannot be verified, the method further comprises: preventing the computing device from booting from the required boot image; and
        preventing the computing device from executing the release image.

8. The computer-implemented method of claim 6, wherein the signature is verified by the execution of firmware instructions stored on a memory associated with the computing device.

9. The computer-implemented method of claim 1, wherein verifying the required third-party factory test was executed includes:
    sending a test report related to the required third-party factory test to a report server, the test report being automatically sent after the required third-party factory test is executed.

10. The computer-implemented method of claim 9, further comprising:
    collecting a plurality of test reports for a plurality of computing devices manufactured over a period of time;
    summarizing the plurality of test reports into a summary report; and
    transmitting the summary report to a remote verification server,
    wherein the summary report is automatically transmitted to the remote verification server on completion of a predetermined number of computing devices.

11. The computer-implemented method of claim 1, wherein, on verifying the required third-party factory test was not executed, preventing the computing device from executing the release image.

12. A system for enforcing a third-party factory test during a quality verification of a newly-manufactured computing device, comprising:
    an assembly line configured to receive one or more computing devices and to assesses a quality of those devices;
    a storage device;
    a monitoring computer including a memory, the memory including testing instructions, that, when executed, cause the monitoring computer to:
        verify a factory implemented test and a required third-party factory test was performed on a device under test;
        verify the required third-party factory test was completed without a failure; and
        on verifying the required third-party factory test was completed without a failure, transmit a test report to the storage device, and update a meta data area of memory in the device under test to execute a release image on a subsequent startup of the device under test.

13. The system of claim 12, wherein the testing instructions, when executed, further cause the monitoring computer to:
    execute the factory implemented test and the required third-party factory test on the device under test.

14. The system of claim 13, wherein the test instructions causing the monitoring computer to execute the factory implemented test and the required third-party factory test includes causing the monitoring computer to: execute a factory boot image to confirm a plurality of components are functioning according to a first predetermined performance criteria; and execute a required boot image to confirm one or more third-party compatible components are functioning according to a second predetermined performance criteria.

15. The system of claim 14, wherein the factory boot image and required boot image are loaded and executed on the device under test in a predetermined order.

16. The system of claim 15, wherein the predetermined order is stored in the memory.

17. The system of claim 16, wherein the test instructions further cause the monitoring computer to: update the meta data area with a confirmation that the factory boot image and the required boot image were executed.

18. The system of claim 14, wherein a signature associated with the required boot image is verified by the execution of firmware instructions stored on the memory, and wherein the test instructions, when executed, further cause the monitoring computer to: read a meta data area to determine that the signature associated with the required boot image was verified.

19. The system of claim 12, wherein the test instructions, when executed, further cause the monitoring computer to:
verify a signature associated with a required boot image to confirm the required boot image has not been modified.

20. The system of claim 19, wherein, if the signature cannot be verified, the test instructions, when executed, further cause the monitoring computer to prevent the device under test from executing the release image.

21. The system of claim 12, wherein the test instructions, when executed, further cause the monitoring computer to: collect at the storage device, a plurality of test reports for a plurality of respective computing devices; summarize the plurality of test results into a summary report; and transmit the summary report to a remote verification server.

22. The system of claim 21, wherein the summary report is automatically transmitted to the remote verification server at predetermined intervals, each predetermined interval determined by the quality verification of a predetermined number of computing devices.

23. The system of claim 12, wherein, on verifying the required third-party factory test was not executed, the testing instructions cause the monitoring computer to prevent the device under test from executing the release image.

24. A non-transitory machine-readable medium including instructions that, when executed, perform a method for enforcing a third-party factory test during a quality verification of newly-manufactured computing devices, the method comprising:
executing a factory boot image on a computing device to confirm a plurality of hardware systems are functioning according to a first predetermined performance criteria;
executing a required boot image on the computing device to confirm one or more third-party compatible hardware systems are functioning according to a second predetermined performance criteria, the factory boot image and the required boot image being executed in a predetermined order;
verify that the required boot image was executed; and
on verifying the boot image was executed, transmitting a test report to a storage location, and configuring a memory area of the computing device to execute a release image on a subsequent startup of the computing device.

* * * * *